F. J. MILLER.
VALVE LOCK.
APPLICATION FILED AUG. 28, 1915.
1,171,453.
Patented Feb. 15, 1916.
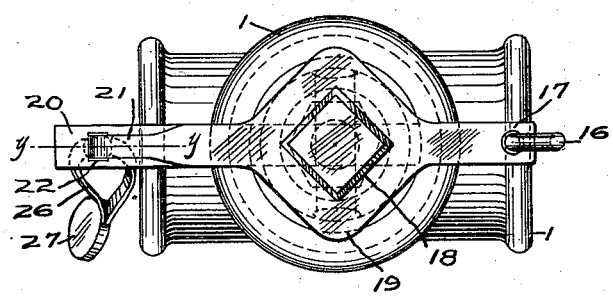
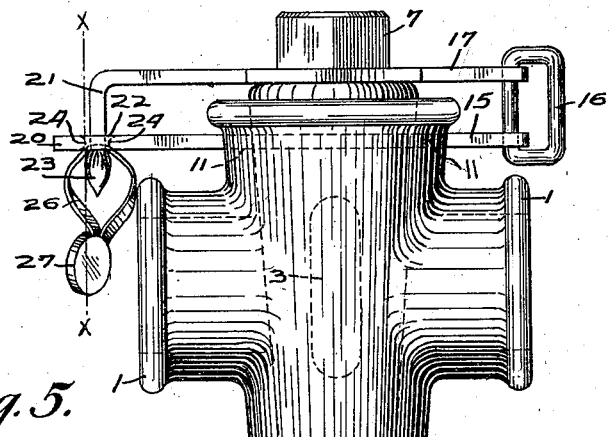
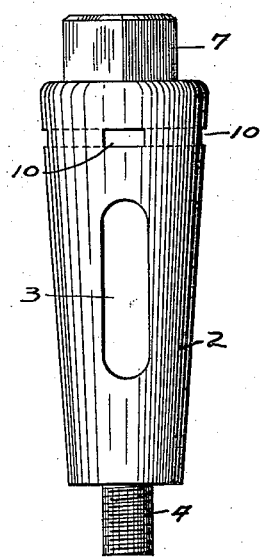
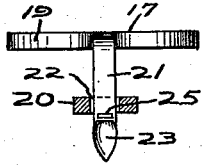
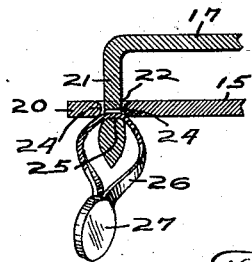
Inventor
Frank J. Miller
by
Owen, Owen + Crampton.
THE COLUMBIA PLANOGRAPH CO., WASHINGTON, D. C.

UNITED STATES PATENT OFFICE.

FRANK J. MILLER, OF FOSTORIA, OHIO.

VALVE-LOCK.

1,171,453.

Specification of Letters Patent.

Patented Feb. 15, 1916.

Application filed August 28, 1915. Serial No. 47,819.

*To all whom it may concern:*

Be it known that I, FRANK J. MILLER, a citizen of the United States, and a resident of Fostoria, in the county of Seneca and State of Ohio, have invented a certain new and useful Valve-Lock; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to valve locks.

By my invention is provided a locking means which not only cannot be opened, or cannot be opened without detection, but also, is so constructed that if the locking means is tampered with, the same will be made to appear.

It has been found that locking means used in connection with crude oil valves may be slightly altered by those who would be benefited by opening the valves and so that the valve can be easily opened and closed without detection. By my invention I have provided a means whereby any alteration or tampering with the locking means will immediately appear.

The invention may be contained in many forms of constructions usable for different purposes, all of which come within the purview of my claims hereinafter appended. To show the practicability of my invention, I have selected one of such constructions as an example and shall describe it hereinafter. The construction selected is illustrated in the accompanying drawings.

Figure 1 in the drawings illustrates a side view of the valve and the locking means. Fig. 2 illustrates a top view of the device shown in Fig. 1. Fig. 3 illustrates a sectional view of one end of the locking means. Fig. 4 illustrates an end view of the locking means and Fig. 5 illustrates the cock of the valve.

1, Fig. 1, is the valve casing in which is located the valve cock 2 having the passageway 3. The valve cock is tapered and fits the casing 1. One end of the valve cock is provided with a reduced portion or tenon 4 which is threaded. The cock is secured in the casing 1 by means of a nut 5 and a washer 6 in the manner well known in the art. The head of the cock is provided with a square or hexagonal portion 7 whereby the cock 2 may be turned by a wrench or other suitable instrument to open and close the valve. The cock is also provided with passageways 10 which extend at right angles to each other through one end of the cock 2. The casing 1 is provided with a passageway or opening 11 which registers with either opening 10. It registers with one opening 10 when the valve is open and with the other passageway 10 when the valve is closed. A rod 15 may be slipped through the openings 10 and 11 to hold the valve open or the valve closed. The rod or strip 15 at one end is provided with a link 16. A second strip 17 having an opening which fits over the square portion 7 or other engageable part of the cock 2 is preferably located over one end of the casing 1. The strip 17 is connected to the strip 15 by the link 16 which is preferably made rectangular to limit any play when the strips are in locking position. The strip 17 is enlarged at its central portion 19 wherein is formed the opening 18. The strip 17 at its outer end 21 may be reduced in one of its dimensions and made narrow. The end 20 of the strip 15 is provided with an opening 22 through which the end 21 of the strip 17 may be inserted. The end 21 of the strip is turned angularly toward the strip 15 in order that it may be more easily inserted in the opening 22. The end of the strip 17 preferably terminates in an arrow head 23 whereby the end of the strip 17 may be easily directed through the opening 22. The opening 22 is provided with beveled or rounded or substantially semi-cylindrical sides 24 and the thickness of the arrow head 23 measured in a plane parallel to that of the strip 15 is preferably substantially the same as the shortest distance between the sides 24 of the opening 22 so that the arrow head 23 will snugly fit the sides of the opening 22 and preferably will only pass through the opening 22 upon a slight pressure on the strip 17 in the direction of the end of the strip 15. The end of the strip 17 is provided with an opening 25 which is located at the base of the arrow head 23.

A locking means may be inserted through the opening 25. In the form of the invention shown a strip of metal 26 having its ends sealed by the seal 27 is passed through the opening 25. The thickness of the strip 26 is sufficient to prevent the arrow head 23 from passing through the opening 22. If the opening 22 is tampered with, so as to permit the strip 26 to pass through the opening it will be immediately detected from the fact that the arrow head will readily pass through the opening 22 without any pressure being applied upon the end of the strip 17; or if the arrow head passes too freely through the opening the same will be detected. If desired the strips may be made slightly elastic so that their elasticity will operate to pull the arrow head through the opening when released unless the strip 26 or other locking means is placed in locking position, or will snap through the opening when pressed toward the strip 15.

The construction selected and described may be greatly modified in the arrangement and manufacture of its parts and in the substitution of elements having equivalent functions and such modifications may be used for many varied purposes and still contain the invention.

Having thus described my invention, what I claim as new, and desire to secure by Letters Patent, is:—

1. In a valve lock, the combination of a pair of strips, means for securing the strips to the valve to prevent rotation of the cock of the valve relative to the valve casing, one strip having an opening and the other strip having an arrow head snugly fitting the opening so as to prevent entrance therein except on applying pressure, the arrow headed strip having an opening, a locking member extending through the opening of the arrow headed strip to prevent withdrawal of the arrow headed strip through the first named opening.

2. In a valve lock, the combination of a pair of strips, means for securing the strips to the valve to prevent rotation of the cock of the valve relative to the valve casing, one strip having an opening and the other strip having an arrow head snugly fitting the opening so as to prevent entrance therein except on applying pressure, the arrow headed strip having an opening, a sealing strip extending through the opening in the arrow headed strip to prevent withdrawal of the arrow head through the first named opening.

3. In a valve lock, the combination of a pair of strips, means for securing the strips to the valve to prevent rotation of the cock of the valve relative to the valve casing, one strip having an opening and the other strip having an arrow head snugly fitting the opening to prevent entrance therein except by pressure on the arrow headed strip, one of the strips being elastic and so positioned relative to the other strip as to tend to cause withdrawal of the arrow headed strip from the opening, the arrow headed strip having an opening and a sealing strip extending through the opening in the arrow headed strip.

In testimony whereof, I have hereunto signed my name to this specification.

FRANK J. MILLER.